T. L. BURTON.
BRAKE RIGGING.
APPLICATION FILED SEPT. 17, 1913.

1,166,178.                                    Patented Dec. 28, 1915.

WITNESSES:

INVENTOR
Thomas L. Burton.
BY Edward A. Wright
ATTORNEY

UNITED STATES PATENT OFFICE.

THOMAS L. BURTON, OF PITTSBURGH, PENNSYLVANIA, ASSIGNOR, BY MESNE ASSIGNMENTS, TO AMERICAN BRAKE COMPANY, OF ST. LOUIS, MISSOURI, A CORPORATION OF MISSOURI.

BRAKE-RIGGING.

1,166,178.

Specification of Letters Patent.  Patented Dec. 28, 1915.

Application filed September 17, 1913.  Serial No. 790,150.

*To all whom it may concern:*

Be it known that I, THOMAS L. BURTON, a citizen of the United States, residing at Pittsburgh, in the county of Allegheny and State of Pennsylvania, have invented a certain new and useful Improvement in Brake-Rigging, of which improvement the following is a specification.

This invention relates to brake rigging of the clasp type, adapted to be employed on pivoted railway trucks having a plurality of pairs of wheels, and in which brake beams and shoes are applied to both sides of each pair of wheels.

The principal object of my invention is to provide an improved construction of this type, in which duplicate sets of substantially horizontal truck levers are employed, one set at each side of the truck, and having one or more intermediate levers, each pivoted upon a fixed fulcrum, with connections for operating the sets of truck levers.

According to a preferred construction, each set of truck levers includes a pair for each pair of wheels, or one lever in each set for each brake beam, the levers being connected in tandem, that is, having rods extending from the first lever to the next and so on through the set to the lever at the other end of the truck, said last lever having a fixed fulcrum upon the frame.

Figure 1:
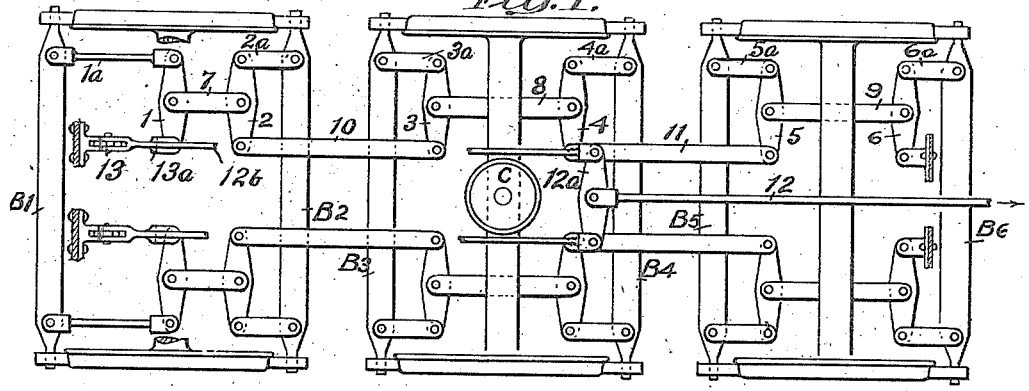
Figure 2:
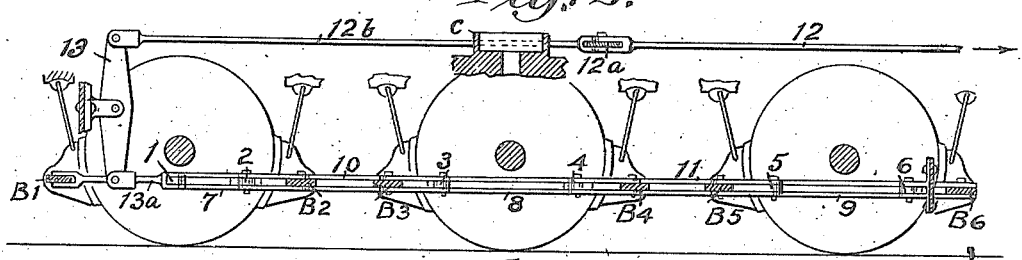
Figure 3:
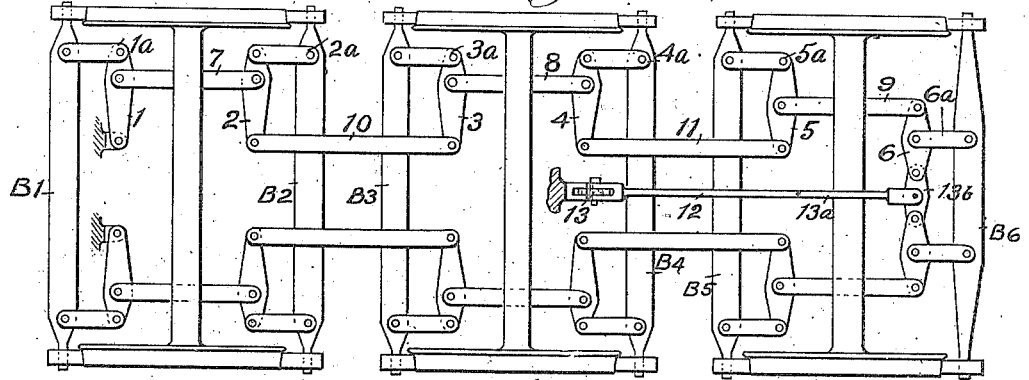

In the accompanying drawings: Figure 1 is a plan of one form of clasp type brake rigging applied to a six-wheeled truck, and embodying my improvement; Fig. 2, a vertical longitudinal section of the same; Fig. 3, a plan similar to Fig. 1, but showing a modified arrangement of the intermediate lever; and, Fig. 4, a vertical section showing the intermediate lever of Fig. 3, but omitting all of the truck levers, rods, and brake beams.

According to the construction shown in Figs. 1 and 2, the improvement is applied to a six-wheeled truck having brake beams, $B^1$, $B^2$, $B^3$, $B^4$, $B^5$, and $B^6$, at both sides of each pair of wheels, and duplicate sets of substantially horizontal truck levers, 1, 2, 3, 4, 5, and 6, upon opposite sides of the truck and approximately in the same plane with the brake beams below the axles or wheel centers, there being a pair of the duplicate truck levers for each brake beam, said truck levers being connected to their respective brake beams by the corresponding links, $1^a$, $2^a$, $3^a$, $4^a$, $5^a$, and $6^a$. The truck levers for each pair of wheels are connected together by the respective tie rods or bars, 7, 8, and 9, while the adjacent levers of the respective parts, such as 2 and 3, and 4 and 5, are connected by the rods or bars, 10 and 11, respectively. In this way the truck levers may be said to be connected in tandem so that as the power is applied to the first truck lever at one end of the truck it is transmitted from one lever to the next and so on through to the last lever, which has a fixed fulcrum at the other end of the truck, and applies all of the brake shoes with substantially equalized pressure.

For the purpose of operating the first truck lever of the duplicate sets, I provide one or more intermediate levers, 13, which are substantially vertical and mounted on a fixed fulcrum on the truck frame, the lower end of said intermediate lever being connected by a rod, $13^a$, with one of the end truck levers. The upper end of the intermediate lever is actuated from the brake cylinder pull rod, 12, by any suitable connection, that shown in Figs. 1 and 2, comprising an equalizer, $12^a$, and connecting rods, $12^b$, leading therefrom upon either side of the center plate C, to the upper ends of the respective levers, 13. The brake cylinder pull rod is thus located above the members of the truck frame more nearly in the plane of the brake cylinder and the power is transmitted down to the plane of the truck lever system and brake beams by means of the vertical intermediate levers.

Figure 4:
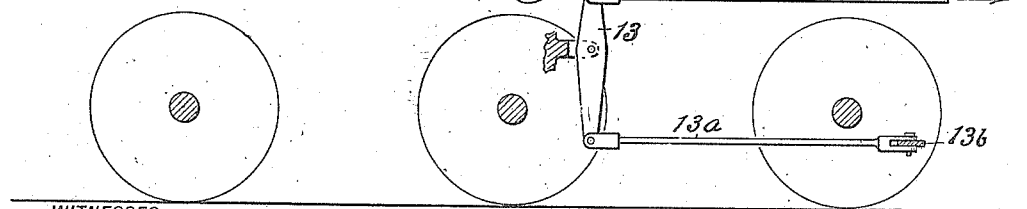

The construction shown in Figs. 3 and 4 is substantially the same as that of Figs. 1 and 2, except that the intermediate lever with the fixed fulcrum is located near the center of the truck instead of at the end, and has its rod, $13^a$, connected by means of an equalizer, $13^b$, with the truck levers, 6, at the opposite end of the truck from that shown in Figs. 1 and 2, the truck levers, 1, in this case constituting the dead levers. In either case, it will be apparent that the power from the brake cylinder pull rod is transmitted by the vertical intermediate lever or levers to the lower plane of the truck levers and through the tandem system of connections to the fulcrum of the last truck lever at the opposite end of the truck, thus applying all of the brake beams and shoes with equalized pressure. In this way, the members of the brake rigging may be readily disposed in such positions as not to interfere with the various parts of the truck.

Having now described my invention, what I claim as new and desire to secure by Letters Patent is:

1. In a brake rigging for pivoted trucks having a plurality of pairs of wheels, the combination with brake shoes applied to both sides of each pair of wheels, of a double set of horizontal truck levers, one set on each side of the truck, rods connecting the truck levers of each set in tandem, an intermediate vertical lever having a fixed fulcrum, a power connection at the upper portion of the lever, and a connection at its lower end for actuating the truck levers.

2. In a brake rigging for pivoted trucks having a plurality of pairs of wheels, the combination with brake beams and shoes applied to both sides of each pair of wheels, of a double set of horizontal truck levers, each lever having a link connection to a brake beam, rods connecting said truck levers in tandem, and an intermediate power lever having a fixed fulcrum and a connection at its lower end for actuating the truck levers.

3. In a brake rigging for pivoted trucks having a plurality of pairs of wheels, the combination with brake beams and shoes applied to both sides of each pair of wheels, of a double set of horizontal truck levers below the wheel axles, each lever having a link connection to a brake beam, rods connecting said truck levers in tandem, and a pair of intermediate levers having fixed fulcrums and connected at their lower ends to the end truck levers.

4. In a brake rigging for pivoted trucks having a plurality of pairs of wheels, the combination with brake beams and shoes applied to both sides of each pair of wheels, of a double set of horizontal truck levers, each lever having a link connection to a brake beam, rods connecting said truck levers in tandem, two intermediate levers, each pivoted upon fixed fulcrum and having its lower end connected to one of the end truck levers, and brake cylinder pull rod connections for the upper ends of said intermediate levers.

In testimony whereof I have hereunto set my hand.

THOMAS L. BURTON.

Witnesses:
J. SNOWDEN BELL,
EDWARD A. WRIGHT.